United States Patent
Young et al.

(10) Patent No.: US 8,243,584 B2
(45) Date of Patent: Aug. 14, 2012

(54) METHOD AND SYSTEM FOR REHOMING A DIGITAL SUBSCRIBER LINE ACCESS MULTIPLEXER

(75) Inventors: Randy S. Young, Lilburn, GA (US); Earl C. Meggison, Lilburn, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1370 days.

(21) Appl. No.: 11/853,464

(22) Filed: Sep. 11, 2007

(65) Prior Publication Data

US 2008/0043926 A1  Feb. 21, 2008

Related U.S. Application Data

(62) Division of application No. 10/157,877, filed on May 31, 2002, now Pat. No. 7,274,655.

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. ........ 370/217; 370/352; 370/248; 370/249; 370/224; 370/397; 370/400; 370/401

(58) Field of Classification Search ............ 370/352, 370/248, 249; 714/716, 717
See application file for complete search history.

(56) References Cited

U.S. PATENT DOCUMENTS

| | | | |
|---|---|---|---|
| 5,459,606 A | 10/1995 | Baranyai et al. | |
| 5,559,877 A | 9/1996 | Ash et al. | |
| 6,181,680 B1 * | 1/2001 | Nagata et al. | 370/248 |
| 6,529,479 B1 | 3/2003 | Suzuki | |
| 2001/0017842 A1 | 8/2001 | Ito | |
| 2003/0169691 A1 * | 9/2003 | Powers et al. | 370/241 |
| 2003/0226072 A1 * | 12/2003 | Bruckman et al. | 714/716 |

* cited by examiner

*Primary Examiner* — Melanie Jagannathan
*Assistant Examiner* — Stephanie Chang
(74) *Attorney, Agent, or Firm* — Cantor Colburn LLP

(57) ABSTRACT

A method and system are provided for rehoming a digital subscriber line access multiplexer between a first data port and a second data port on a data switch. The method includes establishing a physical loop-back circuit between the second data port and a temporary input port of the data switch, establishing an extension permanent virtual circuit between the temporary input port and the first data port, removing a permanent virtual circuit between a data switch servicing a network service provider and the first data port, establishing a permanent virtual circuit between the data switch servicing the network service provider and the second data port, and routing data between the network service provider and the digital subscriber line access multiplexer via the permanent virtual circuit between the data switch servicing the network service provider and the second data port, the physical loop-back circuit, and the extension permanent virtual circuit.

5 Claims, 11 Drawing Sheets

METHOD AND SYSTEM FOR REHOMING A DIGITAL SUBSCRIBER LINE ACCESS MULTIPLEXER

CROSS-REFERENCE TO RELATED APPLICATIONS

This application is a divisional application of U.S. application Ser. No. 10/157,877, filed May 31, 2002, the contents of which are incorporated by reference herein in their entirety.

TECHNICAL FIELD

The present invention generally relates to the field of broadband data communications and, more specifically, relates to the field of digital subscriber line communications.

BACKGROUND OF THE INVENTION

The advent and explosion of the World Wide Web and the Internet have created a huge demand for data communications bandwidth. Once satisfied with a 56 Kb/s analog modem, many home users are now demanding broadband Internet connections capable of sustaining 1.5 MB/S, or more. In order to satisfy this ever-increasing demand for bandwidth to the home and office, several competing standards for data communications have emerged. One of these standards is digital subscriber line ("DSL") technology.

DSL is a high-speed connection that utilizes the same wires as a regular telephone line. DSL offers a number of advantages over other types of high-speed links to the home and office. For instance, because DSL utilizes a higher frequency for data communications than that used for voice communications, the same phone line may be used for both data and voice simultaneously. Moreover, several different types of DSL connections exist that can provide extremely high data rates without requiring new wiring. Therefore, DSL can operate on the existing phone line already present in most homes and businesses. Additionally, other types of broadband connections to the home such as cable modems, utilize a shared network group for a number of subscribers. Adding users to such a shared network means lower performance in many instances. Because DSL provides a dedicated connection from each user back to the nearest central office ("CO"), users typically do not see a performance decrease as new users are added.

A typical DSL installation utilizes two pieces of equipment. A transceiver, or modem, is located at the customer end, and a DSL access multiplexer ("DSLAM") is located at the CO serving the customer. The DSL transceiver located at the customer location connects to a customer's data processing equipment and to the standard telephone line connection located at the customer premises. The DSLAM, located at the central office serving the customer is also connected to the telephone line that the DSL transceiver is connected to. The DSLAM communicates with the DSL transceiver and provides data communication between the central office and the customer premises according to the particular DSL standard implemented. A typical DSLAM takes such connections from many customers and aggregates them onto a single high-capacity connection to the Internet or other type of network. A data switch, such as an asynchronous transfer mode ("ATM") switch is typically utilized to interface the DSLAM to the Internet or other type of data communications network. In some installations, a single data switch may serve multiple DSLAMs.

In some installations, one DSLAM may serve thousands of DSL customers. When the number of customers served by a particular DSLAM approaches the maximum number, it is necessary to "rehome" the DSLAM to another data switch, or to another port on the data switch currently serving the DSLAM. Alternately if the data connection between the data switch serving the DSLAM has become saturated, it may be necessary to upgrade this connection. In order to do so, it is likewise necessary to rehome the DSLAM to another data switch or to another port supporting a faster connection.

Although previous methods exist for rehoming the DSLAM between a data switch or a port on a data switch, these previous methods suffer from a number of serious drawbacks. The first such drawback is the customer data communication outage that occurs when the DSLAM servicing the customer is moved to a new data switch or port. Previous methods for rehoming a DSLAM between data switches or ports on a data switch cause long periods of downtime for DSL customers. Because providing DSL service is a highly competitive business, such downtime may result in the unacceptable loss of customers. At a minimum, such downtime can result in unhappy customers and a reduced network availability metric.

Another drawback with previous methods for rehoming a DSLAM between a data switch, or a port on a data switch, occurs when DSL service is resold to a network service provider ("NSP"). In such a scenario, a permanent virtual circuit ("PVC") is established between the data switch servicing the DSLAM and the NSP. The NSP then resells the DSL service to the end customer. In such a scenario, it is necessary to gain the cooperation of the NSP servicing the customer prior to rehoming the DSLAM. Moreover, coordination is required with the NSP when the DSLAM is rehomed in order to ensure that the downtime experienced by the end-user is minimized. However, it is frequently not possible to obtain the cooperation of the NSP or, even if the cooperation is obtained, it is often difficult to coordinate with the NSP in such a way that minimizes user downtime.

Therefore, in light of the above, there is a need for a method and system for rehoming a DSLAM between data switches, or ports on a data switch, that can minimize the amount of customer downtime experienced when the DSLAM is rehomed. Additionally, there is a need for a method and system for rehoming a DSLAM between data switches, or ports on a data switch, that does not require the participation of a NSP in the rehoming process.

SUMMARY OF THE INVENTION

The present invention solves the above-described problems by providing methods and systems for rehoming a DSLAM between ports on a data switch, that reduce the amount of downtime experienced by DSL customers when a DSLAM is rehomed between data switches or ports on a data switch. Moreover, the various embodiments of the present invention solve the above-described problems by providing a method and system for rehoming a DSLAM that does not require the participation or cooperation of a NSP in the rehoming process.

A method and system are provided for rehoming a digital subscriber line access multiplexer between a first data port and a second data port on a data switch. The method includes establishing a physical loop-back circuit between the second data port and a temporary input port of the data switch, establishing an extension permanent virtual circuit between the temporary input port and the first data port, removing a permanent virtual circuit between a data switch servicing a network service provider and the first data port, establishing a permanent virtual circuit between the data switch servicing the network service provider and the second data port, and routing data between the network service provider and the digital subscriber line access multiplexer via the permanent virtual circuit between the data switch servicing the network service provider and the second data port, the physical loopback circuit, and the extension permanent virtual circuit.

Additional aspects of the present invention will be apparent from the detailed description that follows.

DETAILED DESCRIPTION OF THE EXEMPLARY EMBODIMENTS

In the following detailed description, references are made to the accompanying drawings that form a part hereof, and in which are shown by way of illustration specific embodiments or examples. These embodiments may be combined, other embodiments may be utilized, and structural changes may be made without departing from the spirit and scope of the present invention. The following detailed description is, therefore, not to be taken in a limiting sense, and the scope of the present invention is defined by the appended claims and their equivalents.

Figure 1:
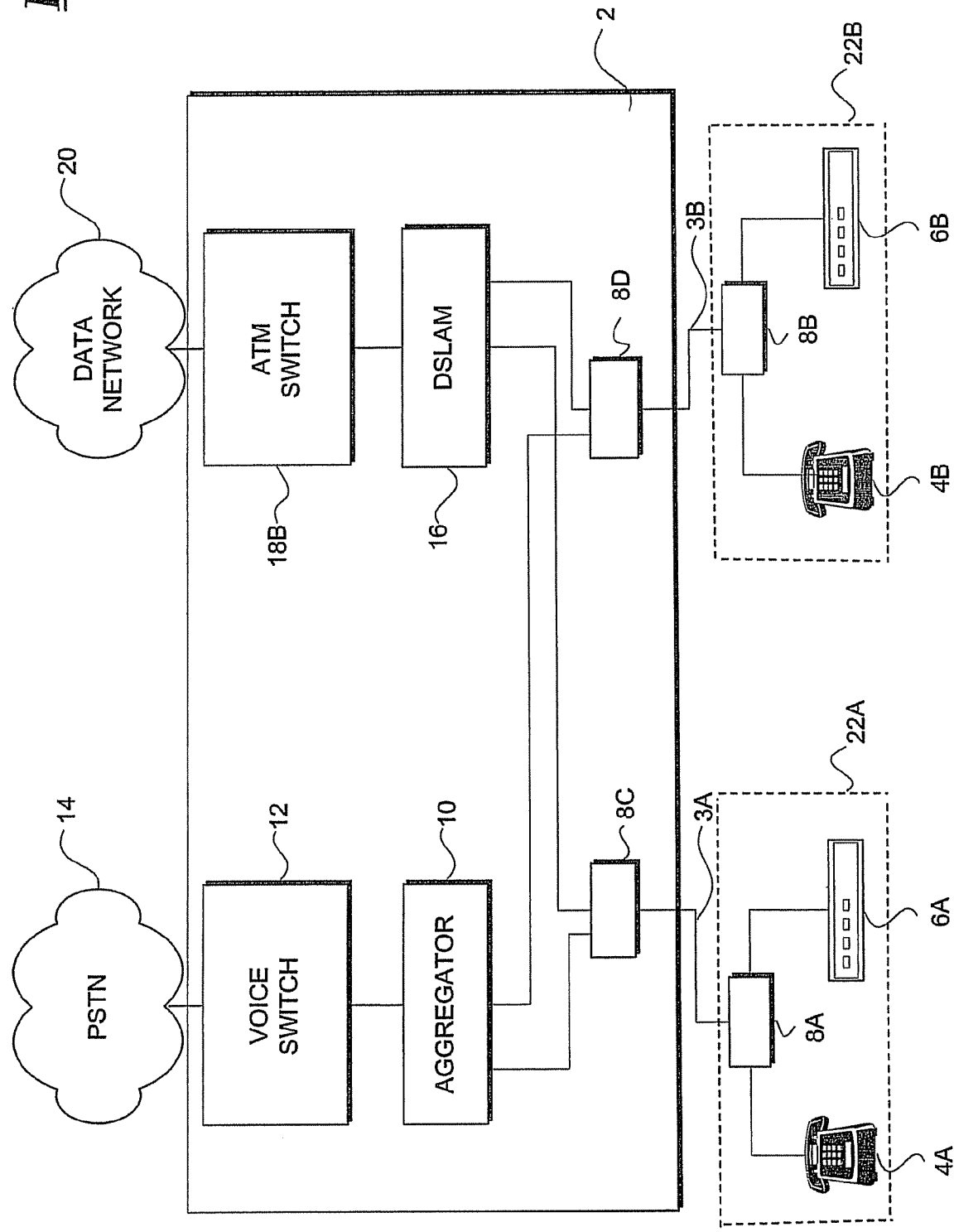
FIG. 1 is a block diagram showing a systems architecture for an illustrative telecommunications system for delivering DSL services.

Referring now to FIG. 1, a systems architecture for implementing a DSL telecommunications service will be described. As shown in FIG. 1, a CO 2 maintains the equipment necessary to provide a DSL telecommunications service to one or more customer premises 22A-22B. In particular, the CO 2 is connected to the customer premises 22A-22B through standard plain old telephone service ("POTS") telephone lines. At the CO 2, the POTS lines connect through splitters 8C-8D. The splitters 8C-8D route each of the incoming POTS lines to the main frame 10 and to the DSLAM 16. In this manner, the voice portion of the signal received from the customer premises 22A-22B may be handled separately from the data portion of the signal. The voice portion of the signal is routed to the aggregator 10 and through the voice switch 12 to the public switch telephone network 14.

The data portion of the signal received on the POTS lines 3A-3B is routed to the DSLAM 16. As known to those skilled in the art, a DSLAM aggregates digital data traffic from digital subscriber lines before the traffic is transferred to an ATM switch 18B, or other type of data switch. The DSLAM 16 is connected to the ATM switch 18B through one or more trunk lines that carry the multiplexed traffic from the DSLAM to the ATM switch 18B. In turn, the ATM switch 18B is connected to the data network 20, which may comprise the Internet, or other type of network. In the illustrative embodiments described herein, the data network 20 comprises an ATM network. As shown in FIG. 1, customer premises 22A-22B include a DSL transceiver 6A-6B and telephones 4A-4B. Splitters 8A-8B are utilized to separate the voice and DSL signals.

As will be described in greater detail below, the DSLAM 16 is specified for serving a maximum number of POTS telephone lines 3A-3B. Accordingly, when the DSLAM 16 reaches the maximum number of specified users, it may be necessary to rehome the DSLAM 16 to a different ATM switch. Moreover, even though the maximum number of users specified for the DSLAM 16 may not be reached, the bandwidth of the trunk connection between the DSLAM 16 and the ATM switch 18B may be exhausted. Therefore, it may be necessary to rehome the DSLAM 16 to another ATM switch 18B having the capability of supporting a faster trunk, or to another port on the ATM switch 18B capable of supporting a faster connection. Embodiments of the present invention provide methods and systems for rehoming the ATM switch 18B in a manner so as to reduce the downtime of the connections to the customer premises 22A-22B.

Figure 2:
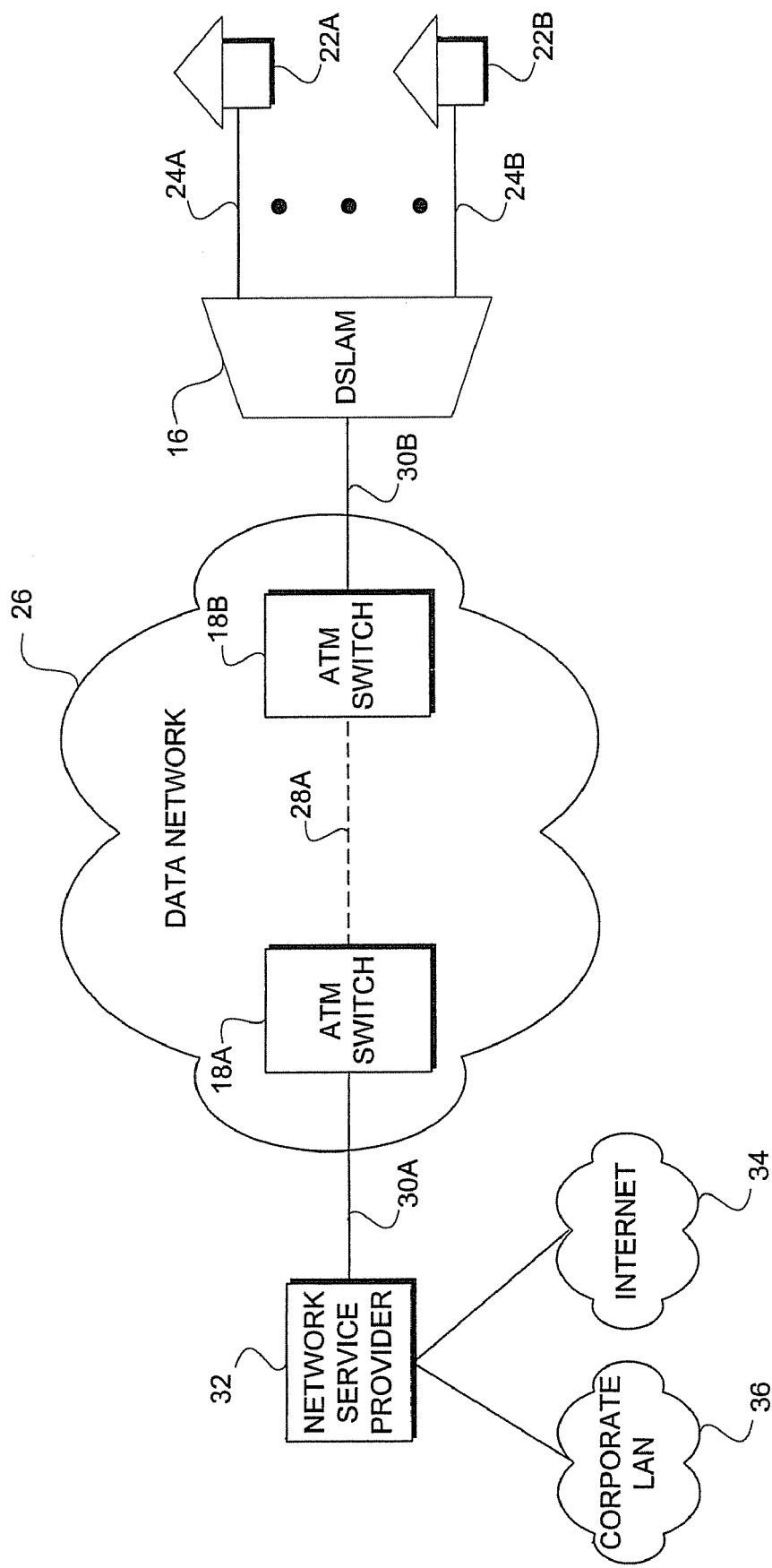
FIG. 2 is a block diagram showing an illustrative operating environment for embodiments of the present invention.

Referring now to FIG. 2, an illustrative operating environment for embodiments of the present invention will be described. As shown in FIG. 2 and described above, the DSLAM 16 serves one or more customer premises 22A-22B through standard POTS telephone lines 24A-24B. The DSLAM 16 is also connected to a data network 26 via an ATM switch 18B and a data connection 30B. According to the illustrative embodiment of the invention described herein, the data network 26 comprises an ATM network, and the data connection 30B comprises a DS3 connection, as known to those skilled in the art.

In the illustrative embodiments of the present invention described herein, the ATM switch 18B servicing the DSLAM 16 is connected to another ATM switch 18A via a PVC 28A. As known to those skilled in the art, a virtual circuit is a connection-oriented network service that is implemented on top of a network, which may be either connection-oriented or connectionless. A permanent virtual circuit comprises a virtual circuit that is permanently established, thereby saving the time associated with virtual circuit establishment and teardown.

In the embodiments of the present invention described herein, the ATM switch 18A services an NSP 32 via the data connections 30A. In such an operating environment, the NSP typically purchases DSL services from a telecommunications company and resells them to the end users. In this scenario, the PVC 28A is utilized to route data communications between the NSP 32 and the customer premises 22A-22B serviced by the NSP 32. Through this type of connection, data processing equipment located at the customer premises 22A-22B may gain access to data and resources located on the Internet 34 or a corporate local area network ("LAN") 36. Other types of data facilities may also be accessible to the customer premises 22A-22B through the NSP 32.

Figure 3:
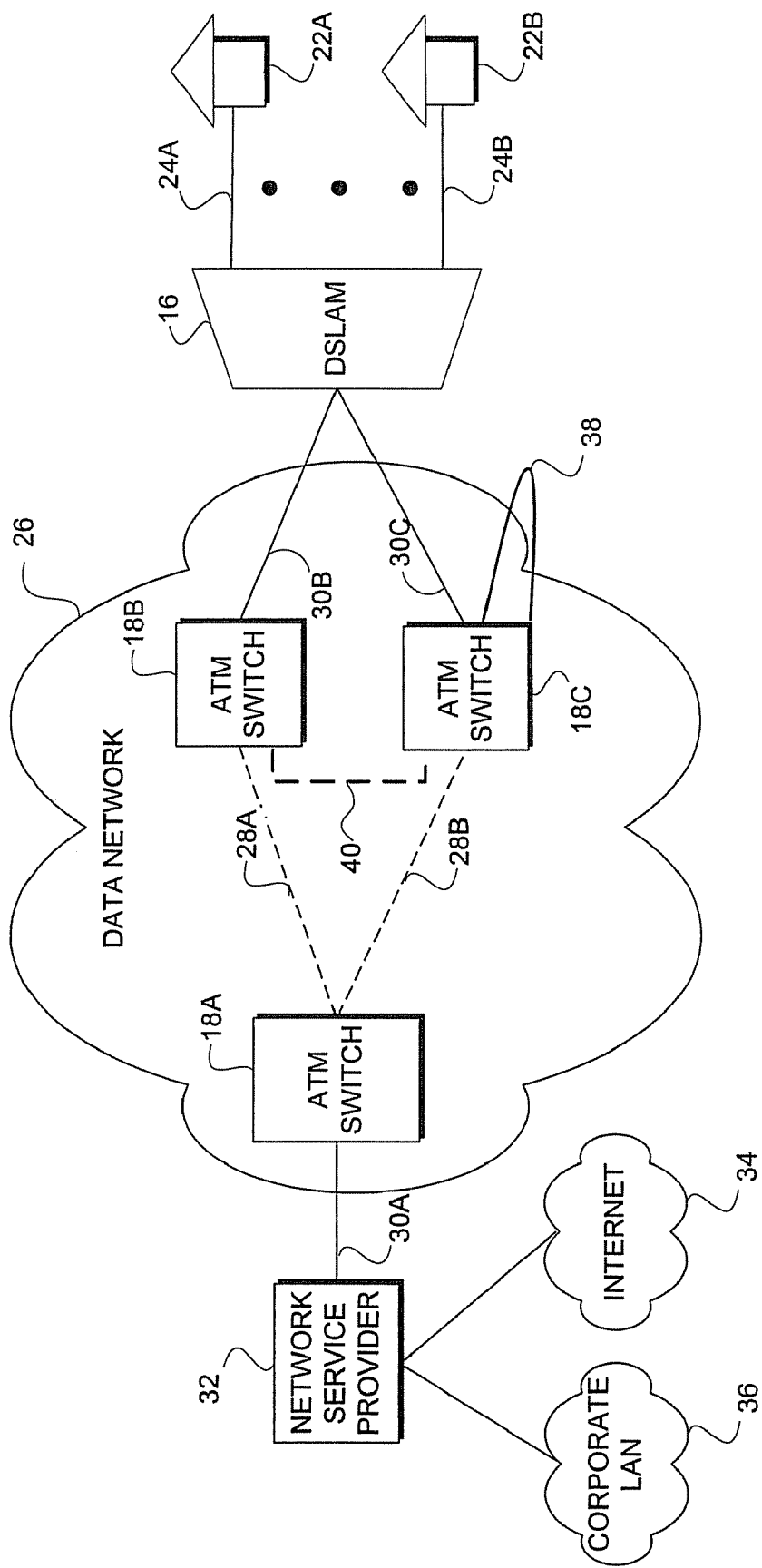
FIG. 3 is a block diagram showing a systems architecture for an embodiment of the present invention in which a DSLAM is rehomed between data switches.

Referring now to FIG. 3, a system will be described for rehoming a DSLAM 16 between the ATM switch 18B and the ATM switch 18C. As discussed above with reference to FIG. 2, the DSLAM 16 communicates with the NSP 32 through the ATM switch 18A, the PVC 28A, and the ATM switch 18B. If, however, it becomes necessary to provide communication between the DSLAM 16 and the NSP 32 through another ATM switch, such as the ATM switch 18C, it is necessary to rehome the DSLAM 16 to the ATM switch 18C in a manner that minimizes the amount of downtime for the DSL connections to the customer premises 22A-22B. Embodiments of the method and system described herein provide solutions for rehoming the DSLAM 16 between the ATM switch 18B and the ATM switch 18C in a manner that minimizes the downtime to the customer premises 22A-22B.

To rehome the DSLAM 16 between the ATM switch 18B and the ATM switch 18C, an extension PVC 40 is created between the ATM switch 18B and the ATM switch 18C. As will be described in greater detail below, the extension PVC 40 is utilized to route data from the NSP 32 to the DSLAM 16 over the data connection 30B while the rehoming process is taking place.

In addition to the extension PVC 40, a physical loop-back circuit 38 is also established at the ATM switch 18C. The physical loop-back circuit 38 routes data from an output port of the ATM switch 18C to a temporary input port of the ATM switch 18C. The physical loop-back circuit 38 is also utilized during the rehoming process and, as will be described below, may be removed once the rehoming process has been completed.

Once the extension PVC 40 and the physical loop-back circuit 38 have been implemented, the PVC 28A between the ATM switch 18A and the ATM switch 18B may be removed. Once the PVC 28A has been removed, no data communication between the NSP 32 and the DSLAM 16 is possible. In order to re-establish data communication, a PVC 28B is established between the ATM switch 18A and the ATM switch 18C.

Once the PVC 28B has been established, data may be routed between the NSP 32 and the DSLAM 16 via the ATM switch 18A, the PVC 28B, the ATM switch 18C, the physical loop-back circuit 38, the extension PVC 40, the ATM switch 18B, and the data connection 30B. In order to completely rehome the DSLAM 16, however, a data connection 30C must be established between the ATM switch 18C and the DSLAM 16. Once the data connection 30C has been established, data may be routed between the NSP 32 via the ATM switch 18A, the PVC 28B, the ATM switch 18C, and the data connection 30C. Once data is being routed in this manner, the extension PVC 40, the physical loop-back circuit 38, and the data connection 30B may be removed.

As described briefly above, it may be necessary to rehome the DSLAM 16 when the bandwidth of the data connection 30B has been exhausted. In such a situation, it is beneficial to implement a data connection 30C to the ATM switch 18C that operates at a higher bandwidth than the data connection 30B. Moreover, it should be appreciated by those skilled in the art that a separate PVC 28 may exist between the ATM switch 18A and the ATM switch 18B for each of the customer premises 22A-22B. In this situation, it is necessary to remove the PVC 28A for each of the DSL lines serviced by the DSLAM 16 and to re-create a PVC 28B between the ATM switch 18A and the ATM switch 18C for a corresponding number of DSL lines serviced by the DSLAM 16.

Figure 4A:
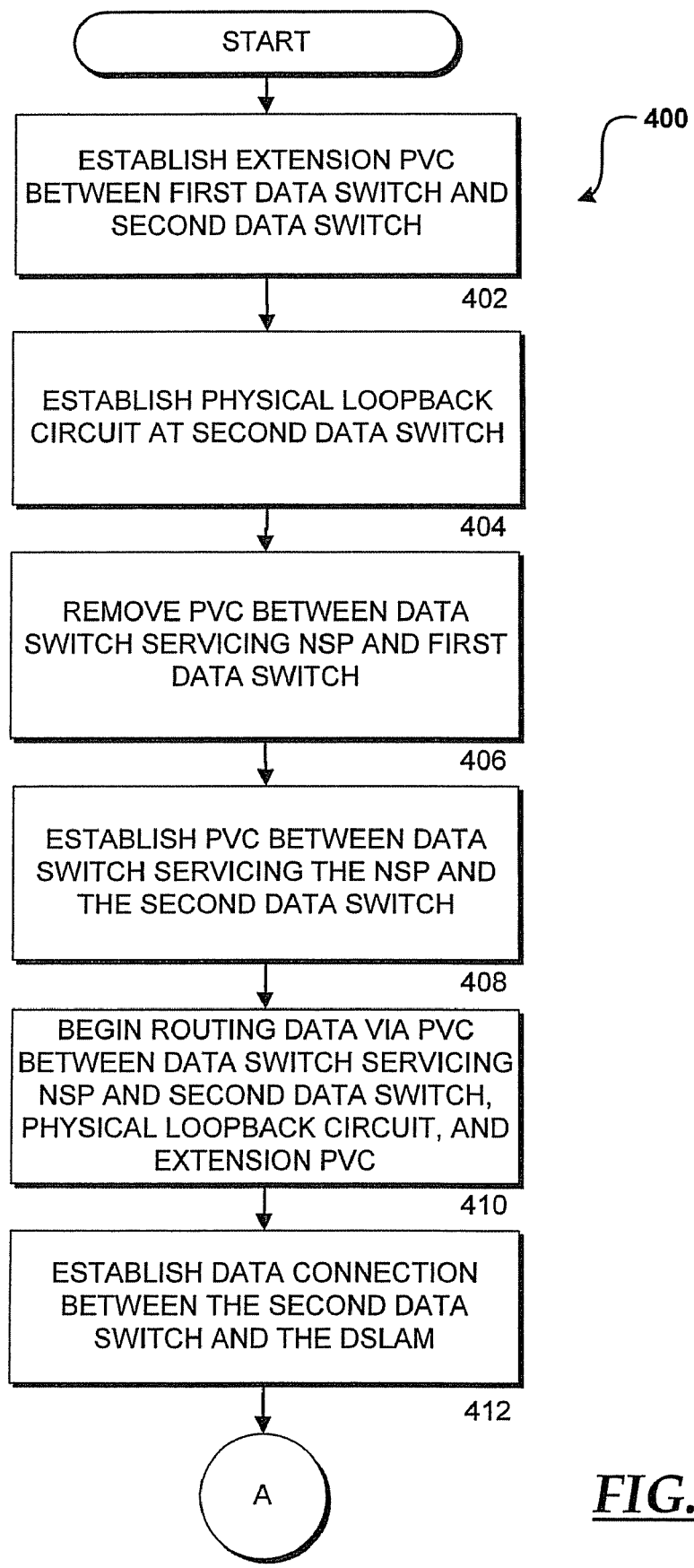
FIGS. 4A and 4B are flow diagrams which illustrate an exemplary method for rehoming a DSLAM between data switches.
Figure 4B:
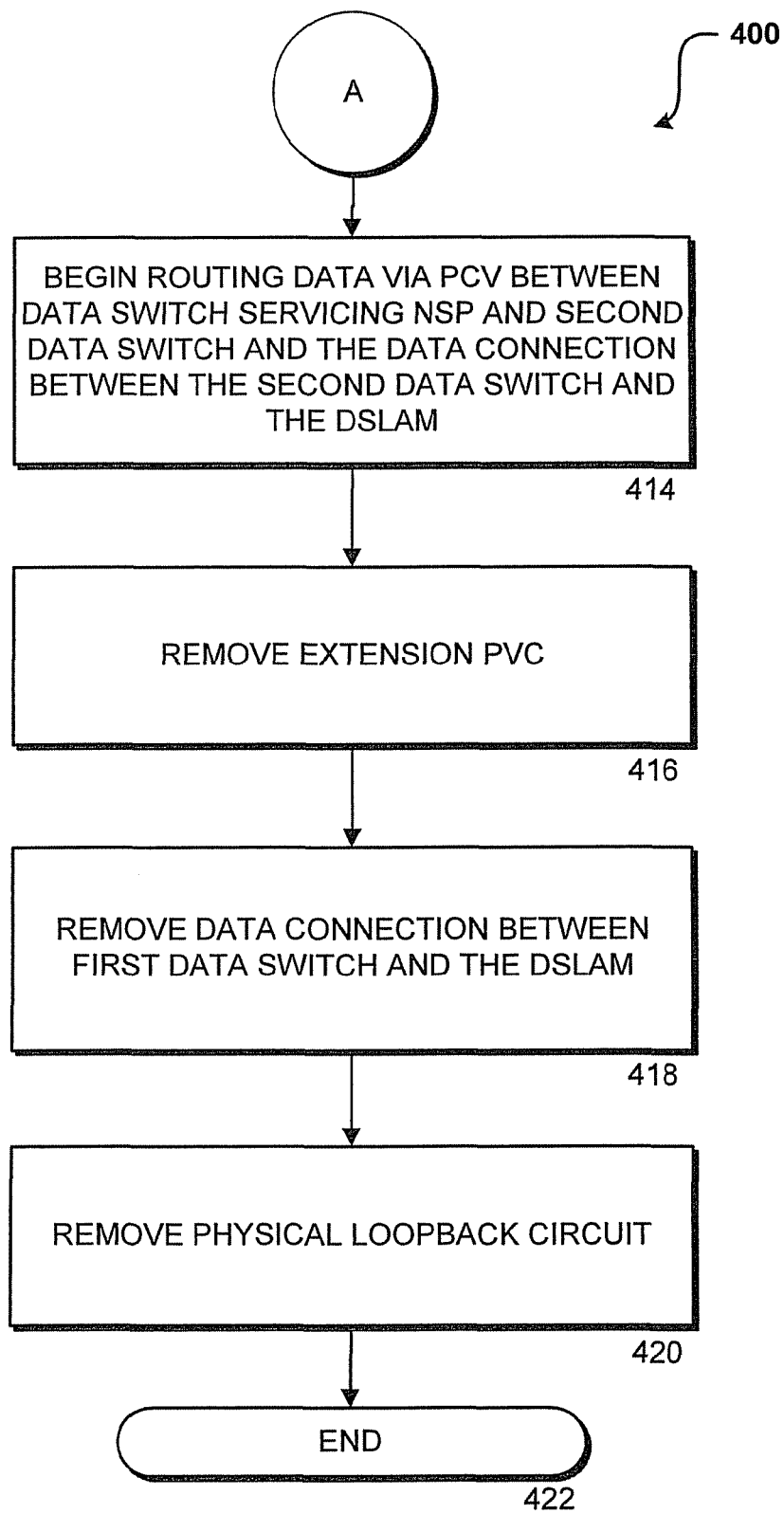

Referring now to FIGS. 4A and 4B, an illustrative routine 400 will be described for rehoming a DSLAM 16 between an ATM data switch 18B and an ATM switch 18C. The routine 400 begins at block 402, where an extension PVC 40 is established between the ATM switch 18B and the ATM switch 18C. The routine 400 then continues to block 404 where a physical loop-back circuit 38 is established at the ATM switch 18C.

From block 404, the routine 400 continues to block 406 where the PVC 28A between the ATM switch 18A and the ATM switch 18B is removed. Once the PVC 28A has been removed, the routine 400 continues to block 408 where a PVC 28B is established between the ATM switch 18A and the ATM switch 18C. From block 408, the routine 400 continues to block 410 where data is routed between the NSP 32 and the DSLAM 16 via the data connection 30A, the ATM switch 18A, the PVC 28B, the ATM switch 18C, the physical loop-back circuit 38, the extension PVC 40, the ATM switch 18B, and the data connection 30B.

From block 410, the routine 400 continues to block 412 where the data connection 30C is established between the DSLAM 16 and the ATM switch 18C. As described above, the bandwidth at which the data connection 30C operates in one embodiment is higher than that of the bandwidth for the connection 30B.

From block 412, the routine 400 continues to block 414, where data is routed between the NSP 32 and the DSLAM 16 via the data connection 30A, the ATM switch 18A, the PVC 28B, the ATM switch 18C, and the data connection 30C. Once data is being routed in this way, the extension PVC 40 is removed at block 416. Additionally, the data connection 30B between the ATM switch 18B and the DSLAM 16 is also removed at block 418. The physical loop-back circuit 38 is then removed at block 420. The routine 400 then continues to block 422, where it ends.

Figure 5:
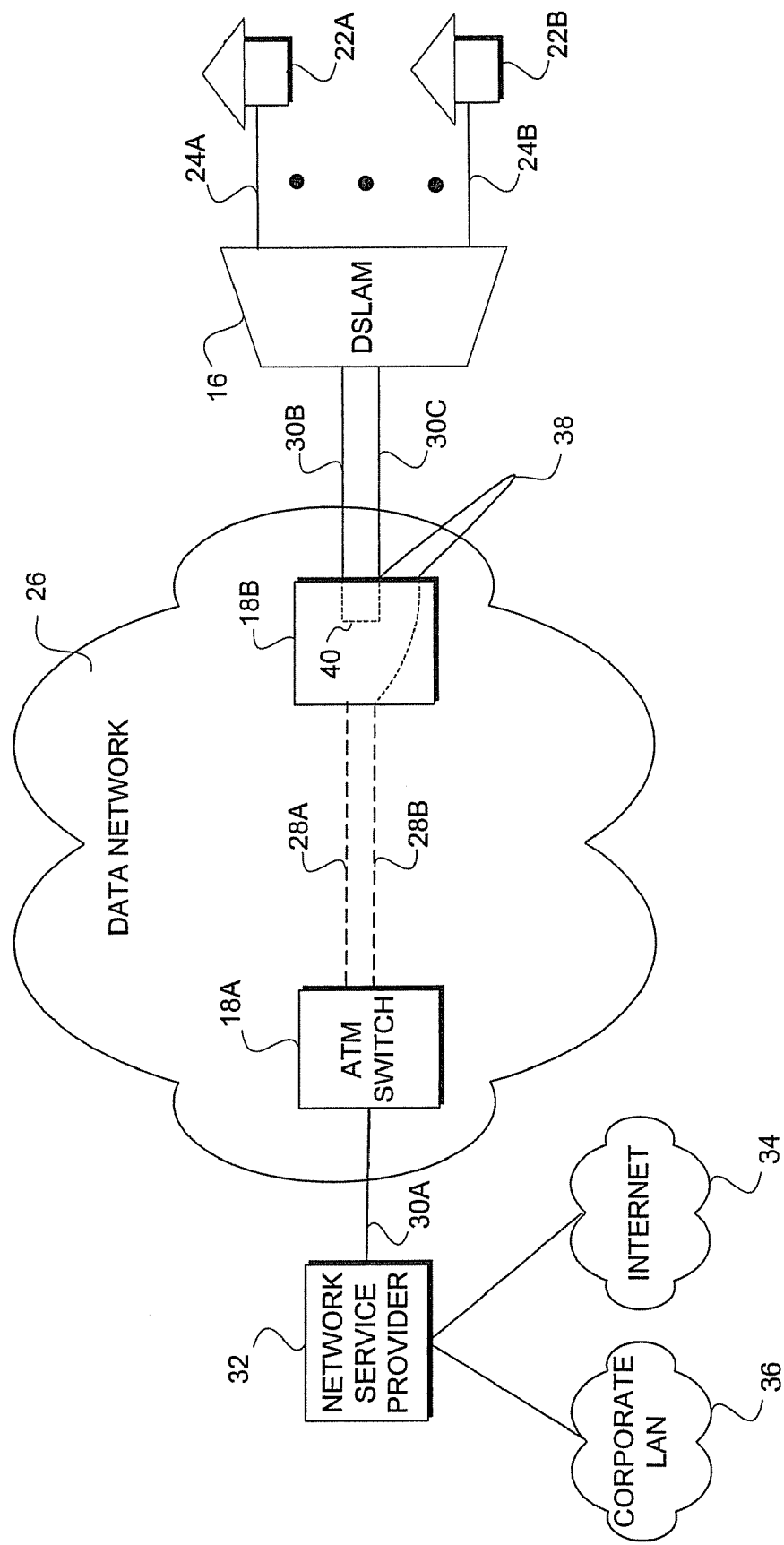
FIG. 5 is a block diagram showing a systems architecture for an illustrative embodiment of the present invention for rehoming a DSLAM between ports on a single data switch.

Referring now to FIG. 5, an illustrative system will be described for rehoming a DSLAM between ports on ATM switch 18B. As described briefly above, the bandwidth of the data connection 30B between a DSLAM 16 and an ATM data switch 18B may quickly become exhausted as the number of customers supported by the DSLAM 16 increases. Therefore, it may be necessary to rehome the DSLAM 16 to another port on the same ATM data switch 18B that supports a higher bandwidth data connection 30C. Aspects of the present invention provide methods and systems for rehoming a DSLAM 16 between separate ports on an ATM data switch 18B while reducing the amount of downtime experienced by the customers served by the DSLAM 16.

In order to rehome the DSLAM 16 between the first and second data ports on the ATM switch 18B, a physical loop-back circuit 38 is first established between the second data port, also called the new data port, and a temporary input port located on the ATM switch 18B. As will be described in greater detail below, the physical loop-back circuit 38 is removed when the rehoming process is completed, thereby freeing up the temporary input port. Additionally, an extension PVC 40 is established within the ATM switch 18B between the temporary input port and the first data port. The first data port is the data port that services the DSLAM 16 prior to the rehoming process.

Once the physical loop-back circuit 38 and the extension PVC 40 have been created, a PVC 28A between the ATM switches 18A and 18B may be removed. Thereafter, a new PVC 28B may be established between the ATM switch 18A and the ATM switch 18B that routes data from the ATM switch 18A to the second data port. In this manner, data can be routed from the NSP 32 through the data connection 30A, the ATM switch 18A, the PVC 28B, the physical loop-back circuit 38, the extension PVC 40, and the data connection 30B.

Once data is being routed through the PVC 28B, the physical loop-back circuit 38 may be removed the second data port. Thereafter, a data connection 30C may be established between the DSLAM 16 and the second data port. In this manner, data is then routed between the NSP 32 and the DSLAM 16 via the data connection 30A, the ATM switch 18A, the PVC 28B, and the data connection 30C. The extension PVC 40 may then be removed along with the data connection 30B between the DSLAM 16 and the first data port on the ATM switch 18B. An illustrative method for rehoming a DSLAM 16 between ports on an ATM data switch 18B is described below with reference to FIGS. 6A-6B.

Figure 6A:
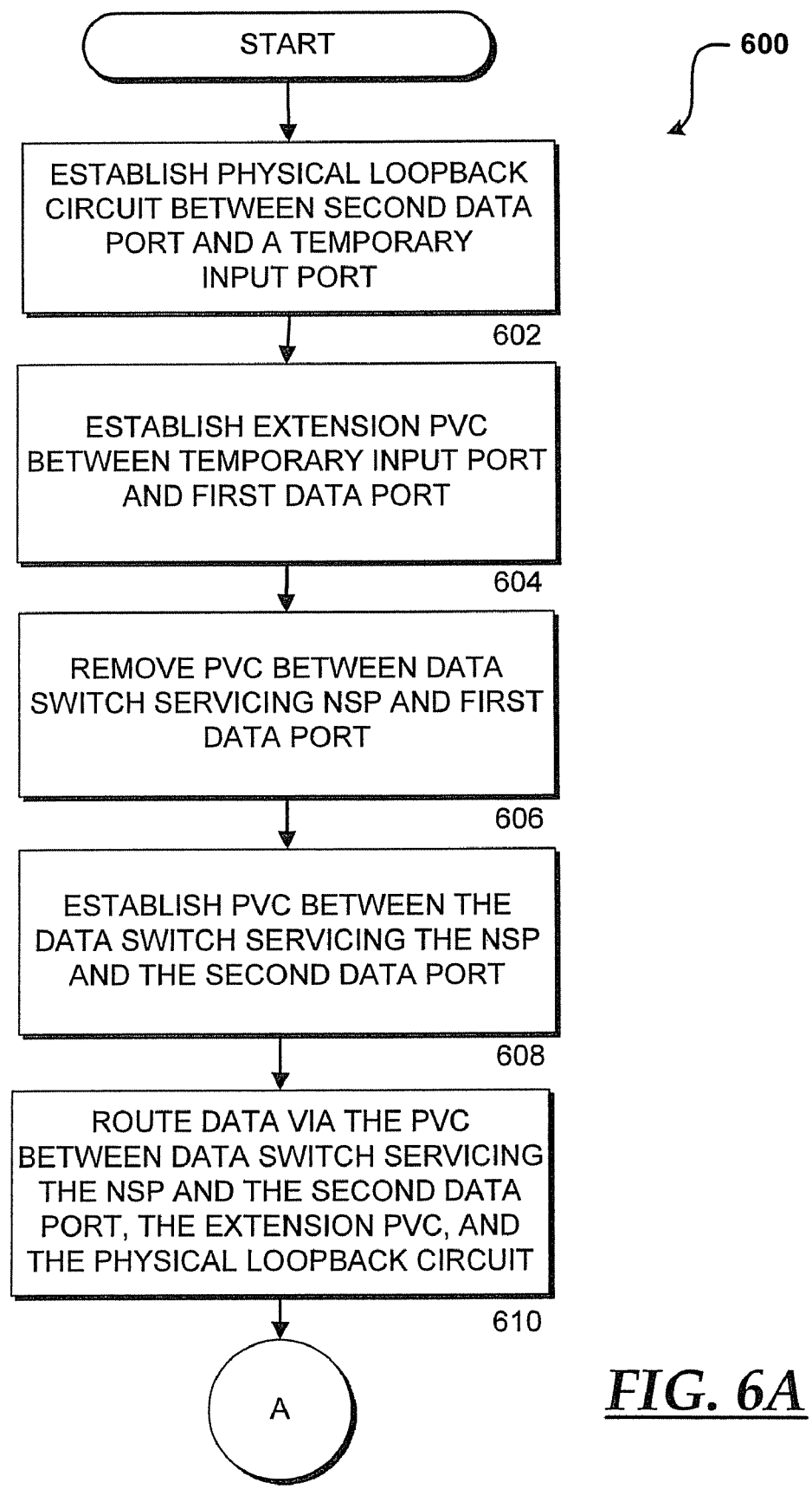
FIGS. 6A and 6B are flow diagrams illustrating an exemplary method for rehoming a DSLAM between ports on a single data switch.
Figure 6B:
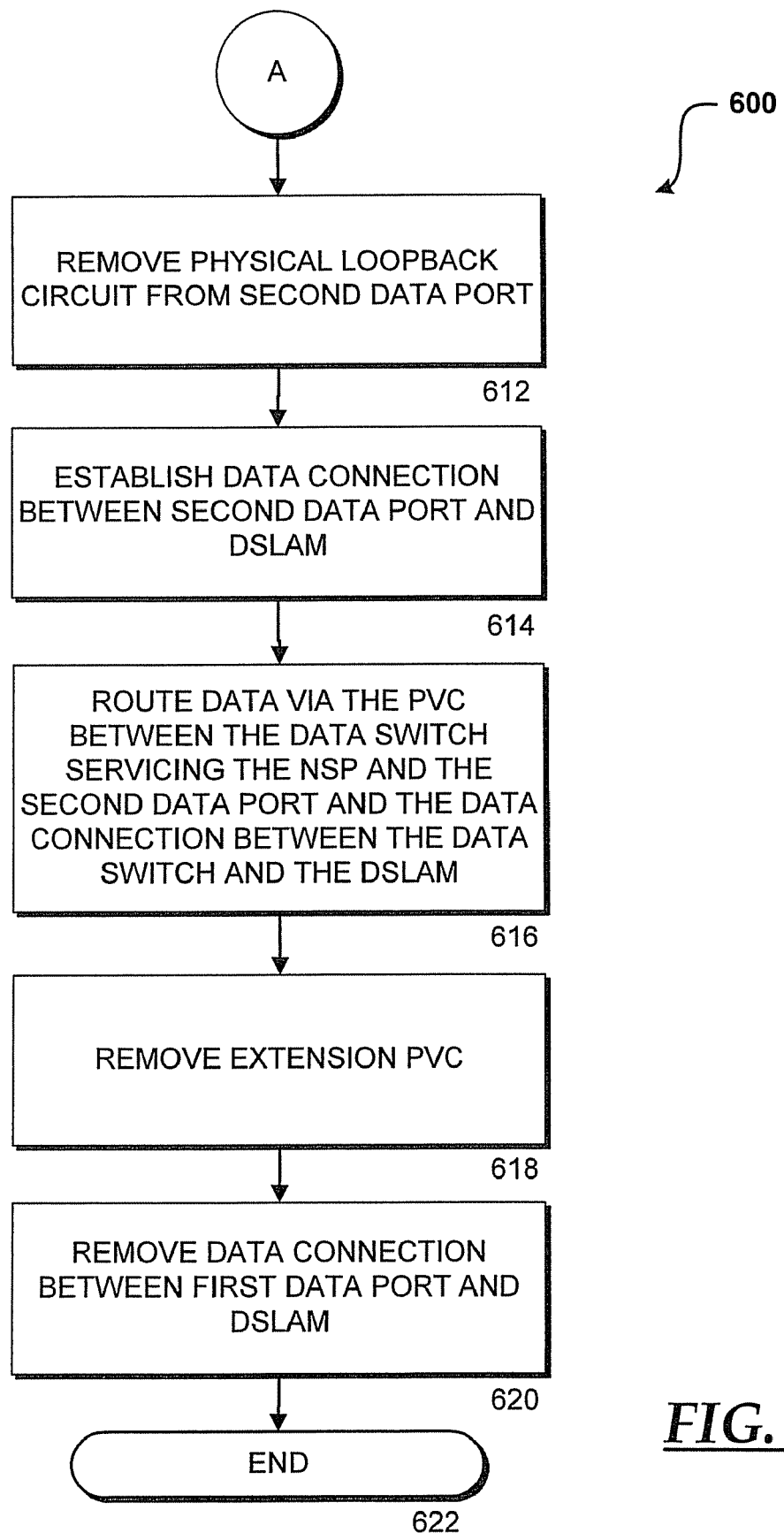

Referring now to FIGS. 6A-6B, an illustrative routine 600 will be described for rehoming a DSLAM 16 between data ports on an ATM switch 18B. The routine 600 begins at block 602, where a physical loop-back circuit 38 is established between a second data port on the ATM switch 18B and a temporary input port on the ATM switch 18B. As described above, the second data port comprises the port to which the DSLAM 16 will ultimately be rehomed. Moreover, the temporary input port may comprise any port on the data switch 18B with sufficient bandwidth. The temporary input port will be returned to the ATM switch 18B when the rehoming process has been completed.

From block 602, the routine 600 continues to block 604 where an extension PVC 40 is created within the ATM switch 18B between the temporary input port and the first data port that is connected to the data connection 30B. Once the extension PVC 40 has been created, the PVC 28 between the ATM switch 18A and the first data port of the ATM switch 18B is removed. Routine 600 then continues to block 608, where a new PVC, the PVC 28B, is established between the ATM switch 18A and the second port on the ATM switch 18B. Once the PVC 28B has been established, data may be routed between the NSP 32 and the DSLAM 16 via the data connection 30A, the ATM switch 18A, the PVC 28B, the physical loop-back circuit 38, the extension PVC 40, and the data connection 30B.

From block 610, the routine 600 continues to block 612, where the physical loop-back circuit 38 is removed from the second data port of the data switch 18B. The routine 600 then continues to block 614, where the data connection 30C is established between the DSLAM 16 and the second data port of the data switch 18B.

Once the physical loop-back circuit 38 has been removed, data may be routed between the NSP 32 and the DSLAM 16 via the data connection 30A, the ATM switch 18A, the PVC 28B, the data switch 18B, and the data connection 30C. Once data has been routed in this manner, the extension PVC 40 may be removed from the data switch 18B at block 618. Additionally, the data connection 30B between the data switch 18B and the DSLAM 16 maybe disconnected at block 620. The routine 600 then continues to block 622, where it ends.

Figure 7:
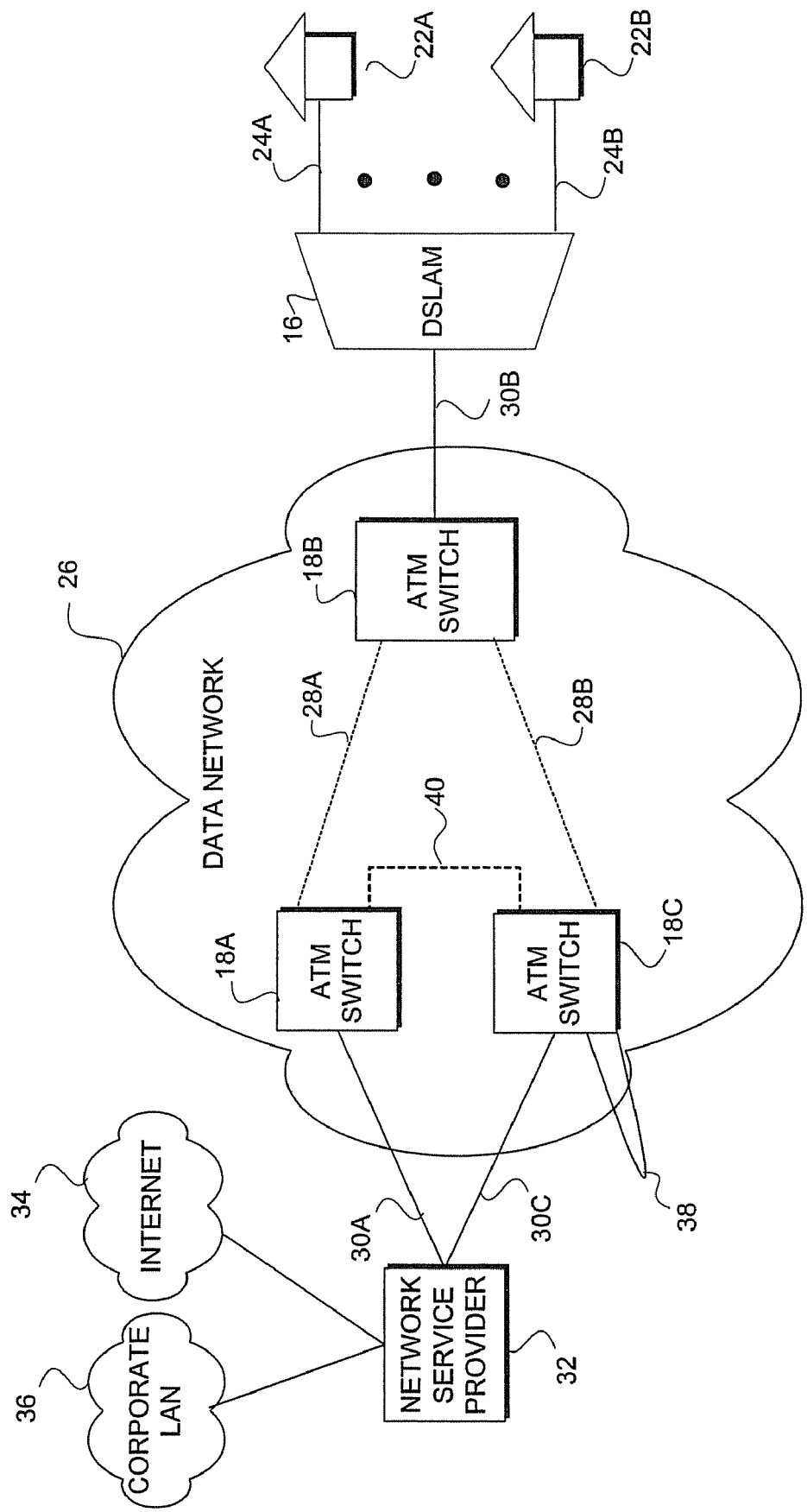
FIG. 7 is a block diagram illustrating a systems architecture for rehoming an NSP between two data switches.

Referring now to FIG. 7, an illustrative system will be described for rehoming an NSP 32 between an ATM switch 18A and an ATM switch 18C. As described above, the bandwidth of the data connection 30B between the ATM switch 18B and the DSLAM 16 may become exhausted. A similar situation may also occur at the NSP 32 when the bandwidth of the data connection 30A becomes depleted. Therefore, it may be necessary to rehome the NSP 32 to another ATM switch 18C from a currently utilized ATM switch 18A or to another port. The system for accomplishing this is illustrated in FIG. 7.

In order to rehome the NSP 32, a PVC 40 may be established between the data switch 18A currently serving the NSP 32 and the ATM switch 18C to which the NSP 32 will be rehomed. A physical loop-back circuit 38 may also be established at the ATM switch 18C for routing data from an output port of the ATM switch 18C to a temporary input port of the ATM switch 18C.

Once the PVC 40 and the physical loop-back circuit 38 have been created, a PVC 28A between the ATM switch 18A and the ATM switch 18B may be removed. Additionally, a new PVC 28B may be established between the new ATM switch 18C and the ATM switch 18B.

Once the PVC 28B has been established, data may be routed between the NSP 32 and the DSLAM 16 via the data connection 30A, the ATM switch 18A, the extension PVC 40, the physical loop-back circuit 38, and the PVC 28B. A data connection may then be established between the ATM switch 18C and the NSP 32. Once the data connection 30C has been established, data may be routed between the NSP 32 and the DSLAM 16 via the data connection 30C, the ATM switch 18C, and the PVC 28B.

Once data is being routed via the PVC 28B, the extension PVC 40, the data connection 30A, and the physical loop-back circuit 38 may be removed. It should also be appreciated that the NSP 32 may be rehomed between ports on a single ATM switch in a similar manner.

Figure 8A:
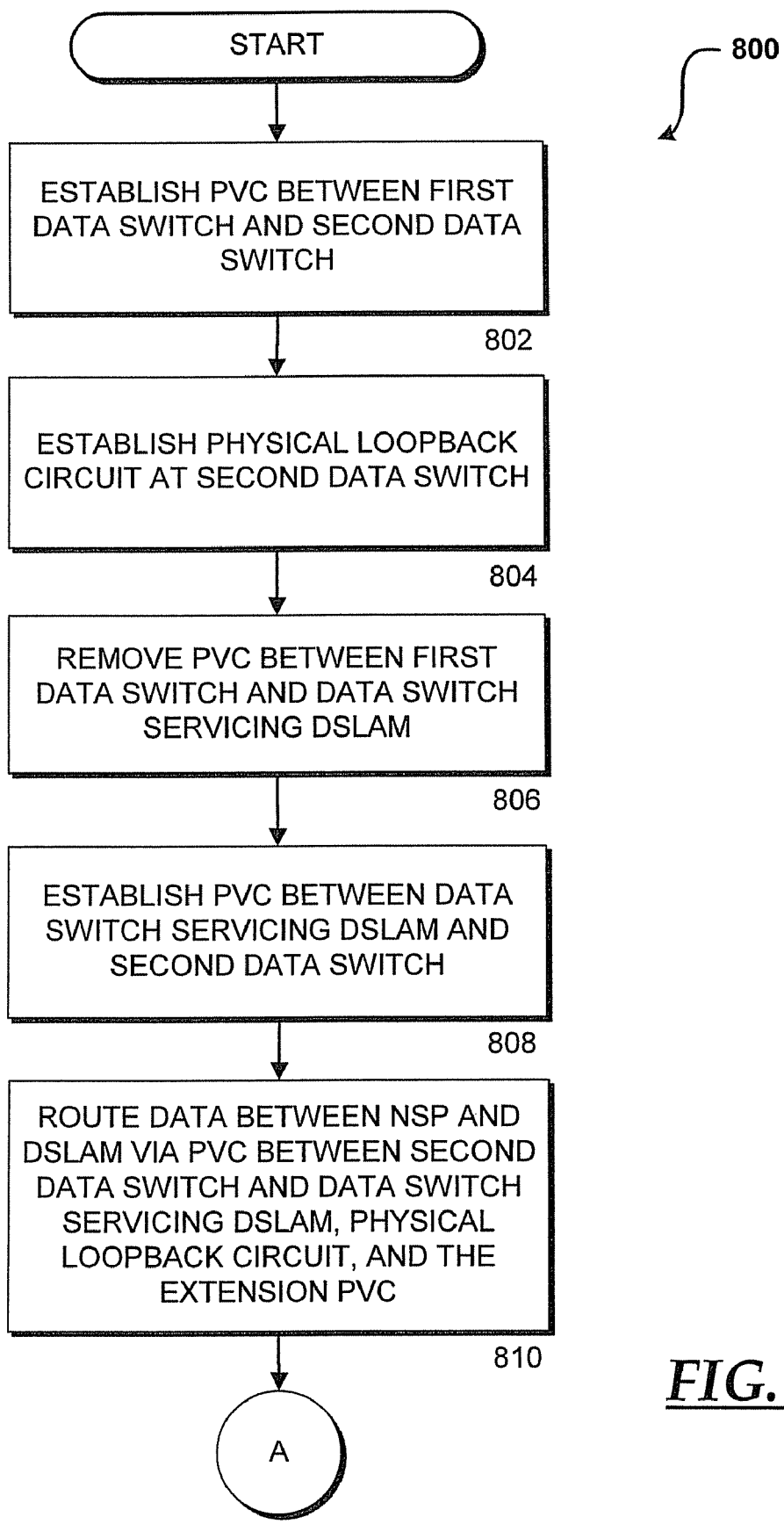
FIGS. 8A and 8B are flow diagrams showing an illustrative method for rehoming an NSP between two data switches.
Figure 8B:
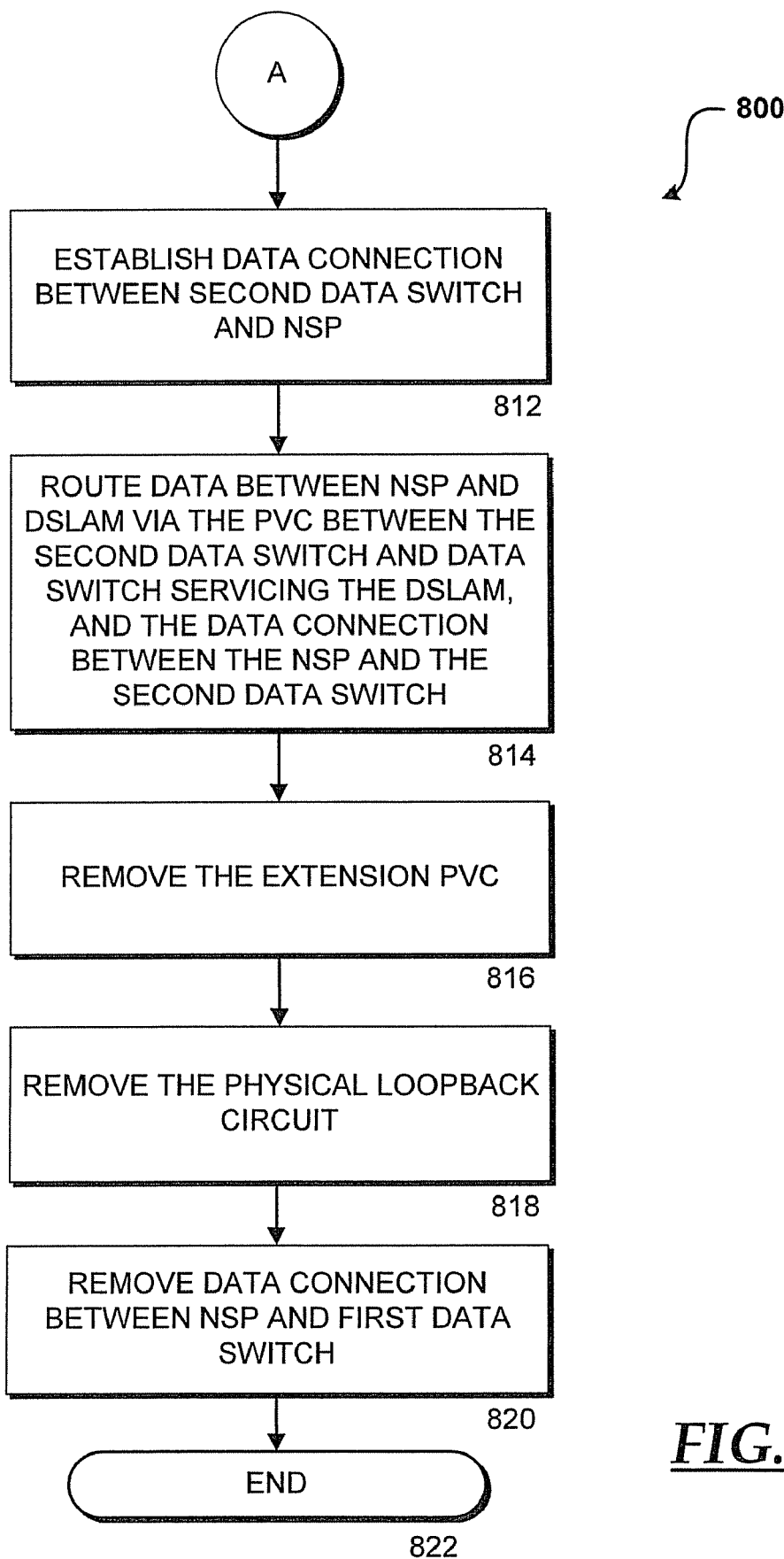

Referring now to FIGS. 8A and 8B, an illustrative routine 800 will be described for rehoming an NSP 32 between ATM switch 18A and ATM switch 18C. The routine 800 begins at block 802, where an extension PVC 40 is established between the ATM switch 18A and the ATM switch 18C. The routine 800 then continues to block 804, where the physical loop-back circuit 38 is established between ports of the ATM switch 18C.

From block 804, the routine 800 continues to block 806, where the PVC 28A between the ATM switch 18A and the ATM switch 18B is removed. Once this has been accomplished, a new PVC, the PVC 28B, is established between the ATM switch 18C and the ATM switch 18B. Once the PVC 28B has been established, data may be routed between the NSP 32 and the DSLAM 16 via the data connection 30A, the extension PVC 40, the physical loop-back circuit 38, and the PVC 28B.

From block 810, the routine 800 continues to block 812, where the data connection 30C is established between the NSP 32 and the ATM switch 18C. Once this connection has been established, the routine 800 continues to block 814, where data is then routed between the NSP 32 and the DSLAM 16 via the data connection 30C, the ATM switch 18C, the PVC 28B, and the ATM switch 18B.

Once data is being routed via the PVC 28B, the extension PVC 40 may be removed at block 816, the physical loop-back circuit 38 may be removed at block 818, and the data connection 38A may be removed at block 820. From block 820, the routine 800 continues to block 822, where it ends.

Based on the foregoing, it should be appreciated that the embodiments of the present invention provide methods and systems for rehoming a DSLAM between switches or ports on a switch and rehoming an NSP between data switches or ports on a data switch. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for rehoming a digital subscriber line access multiplexer between a first data port and a second data port, both of which reside on a first data switch, the method comprising:

establishing a physical loop-back circuit between the second data port and a temporary input port of the first data switch;

establishing an extension permanent virtual circuit between the temporary input port and the first data port, the first data port coupled to a first data connection between the first data switch and the digital subscriber line access multiplexer;

responsive to establishing the extension permanent virtual circuit, removing a permanent virtual circuit between a second data switch, the second data switch servicing a network service provider and the first data port;

establishing a new permanent virtual circuit between the second data switch servicing the network service provider and the second data port;

responsive to establishing the new permanent virtual circuit, routing data between the network service provider and the digital subscriber line access multiplexer via the new permanent virtual circuit between the second data switch the second data port, the physical loop-back circuit, the extension permanent virtual circuit, and the first data connection between the first data switch and the digital subscriber line access multiplexer;

removing the physical loop-back circuit from the second data port;

establishing a second data connection between the second data port and a port on the digital subscriber line access multiplexer;

responsive to removing the physical loop-back circuit, routing data between the network service provider and the digital subscriber line access multiplexer via the new permanent virtual circuit between the second data switch and the second data port and the second data connection between the second data port and the digital subscriber line access multiplexer;

removing the extension permanent virtual circuit between the first data port and the temporary input port; and disconnecting the first data connection between the first data port of the first data switch and the digital subscriber line access multiplexer.

2. The method of claim 1, wherein the physical loop-back circuit and the second data connection between the second data port and the port on the digital subscriber line access multiplexer operate at a first bandwidth and wherein the first data connection between the first data port and the digital subscriber line access multiplexer operates at a second bandwidth.

3. The method of claim 2, wherein the first bandwidth is greater than the second bandwidth.

4. The method of claim 1, wherein the first data switch and the second data switch servicing the network service provider comprise asynchronous transfer mode switches.

5. The method of claim 1, wherein removing the permanent virtual circuit between the second data switch servicing the network service provider and the first data port comprises removing the permanent virtual circuit between the second data switch servicing the network service provider and the first data port for each of a plurality of digital subscriber lines serviced by the digital subscriber line access multiplexer; and wherein establishing the permanent virtual circuit between the second data switch servicing the network service provider and the second data port comprises establishing a permanent virtual circuit between the second data switch servicing the network service provider and the second data port for each of the plurality of digital subscriber lines serviced by the digital subscriber line access multiplexer.

* * * * *